United States Patent [19]
Yoshikawa

[11] Patent Number: 5,081,358
[45] Date of Patent: Jan. 14, 1992

[54] DETECTOR OF FOURIER TRANSFORM INFRARED SPECTROMETER

[75] Inventor: Osamu Yoshikawa, Kyoto, Japan
[73] Assignee: Shimadzu Corporation, Kyoto, Japan
[21] Appl. No.: 634,604
[22] Filed: Dec. 27, 1990
[30] Foreign Application Priority Data
Feb. 23, 1990 [JP] Japan ............................ 2-43960
[51] Int. Cl.⁵ .................... G01N 21/45; G01J 5/06
[52] U.S. Cl. ................................ 250/338.3; 250/352
[58] Field of Search ............... 250/338.3, 352, 370.15

[56] References Cited
U.S. PATENT DOCUMENTS
4,950,900 8/1990 Takeuchi et al. ............... 250/352
4,990,782 2/1991 Wellman et al. ............ 250/370.15

Primary Examiner—Carolyn E. Fields
Assistant Examiner—Drew A. Dunn

[57] ABSTRACT

A detector comprising a pyroelectric detector, a temperature control mechanism including a thermoelectric heating/cooling element for keeping the temperature of the pyroelectric detector constant, a temperature sensor, and a temperature controller responsive to the detection signal from the temperature sensor for controlling power supply to the thermoelectric heating/cooling element, and control unit provided within the temperature controller for pyroelectric detector. Synchronizing the operation of the pyroelectric detector and the thermoelectric heating/cooling element such that the power supply of the thermoelectric heating/cooling element is turned on and off only when data is not being collected by the pyroelectric detector.

6 Claims, 6 Drawing Sheets

DETECTOR OF FOURIER TRANSFORM INFRARED SPECTROMETER

BACKGROUND OF THE INVENTION

The present invention relates to a detector of a fourier transform infrared spectrometer (FTIR) and, more particularly, a detector using a pyroelectric detector.

Figure 11:
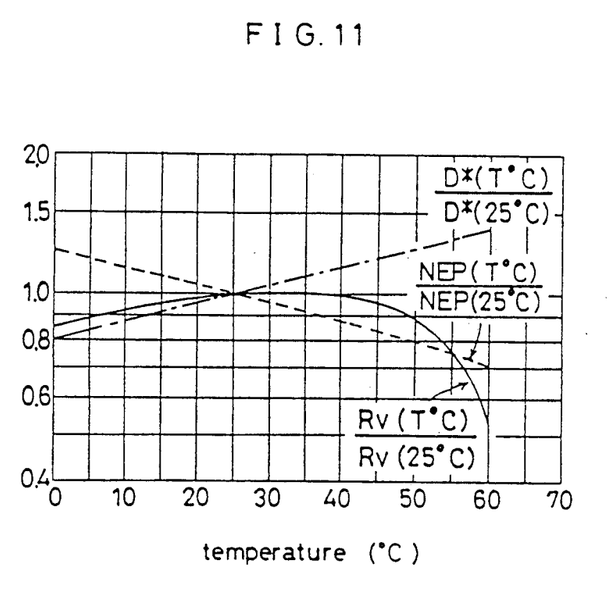
FIG. 11 is a graph showing temperature dependence of a figure of merit in the pyroelectric detector.

The conventional pyroelectric detector is typically a pyroelectric detector of TGS (triglycine sulphide), a DTGS pyroelectric detector of the type in which the hydrogen atom of the TGS pyroelectric detector is replaced by the heavy hydrogen atom, or a DLATGS pyroelectric detector in which L-alanine is doped with the DTGS pyroelectric detector. These pyroelectric detectors have low Curie temperatures. For example, the Curie temperature of the TGS pyroelectric detector is about 49° C. and the Curie temperatures of the DTGS and the DLATGS pyroelectric temperatures are about 62° C. Hence, the figures of merit of the pyroelectric is strongly depend upon the temperature. FIG. 11 shows an example of temperature dependence of the figure of merit in the pyroelectric detector. The data of FIG. 11 are given by the DLATGS pyroelectric detector produced by British Philips under the trade name of RPY104. In FIG. 11, Rv represents sensitivity, NEP represents Noises Equivalent Power, and D* is a figure of merit given by Rv and NEP, totally, indicating a S/N ratio. The data of the figure of merit are normalized based on the value at 25° C. When this DLATGS pyroelectric detector is used, in order to give priority to the stability in the vertical axis of the spectra, it is preferable that the detector should be operated in the range of about 30°-35° C., where at which the sensitivity Rv is rather constant. On the other hand, to obtain the maximum S/N ratio, the detector should be used at about 60° C.

Since the pyroelectric detector shows strong temperature dependence on the figure of merit, a temperature control mechanism should be provided for keeping the temperature of the pyroelectric detector constant whether it is used at room temperature or a higher temperature. Such a temperature control mechanism comprises a thermoelectric cooling element such as a Peltier element close to the pyroelectric detector. The temperature control operation in the conventional pyroelectric detector is done without being synchronized with the data collection by the pyroelectric detector. The input impedance of the pyroelectric detector is high in the range of $10^{10}\Omega$. Therefore, when a power supply to the thermoelectric cooling element close to the pyroelectric detector is started or shut off, the radiation noise of the electromagnetic wave affects the pyroelectric detector, so that the apparent S/N ratio of the detection signals suffers.

SUMMARY OF THE PRESENT INVENTION

The object of the present invention is to provide an improved a detector comprising a pyroelectric detector and a temperature control mechanism for keeping the temperature of the pyroelectric detector such that the S/N ratio of the detection signal of the pyroelectric detector does not suffer even when a power supply to a thermoelectric cooling element in the temperature control mechanism is started and shut off.

Briefly described, in accordance with the present invention, a detector comprising a pyroelectric detector, a temperature control mechanism including a thermoelectric heating/cooling element for keeping the temperature of the pyroelectric detector, constant, and a temperature sensor, and a temperature controller responsive to the detection signal from the temperature sensor for controlling power supply to the thermoelectric heating/cooling element, and a control unit provided within the temperature controller for starting and shutting off the power supply to the thermoelectric heating/cooling element when collection of data from the pyroelectric detector is not occuring.

According to the present invention, when the power supply to the thermoelectric heating/cooling element is started and shut off, the data is not collected from the pyroelectric detector by controlling the operation of the temperature control mechanism. The control unit is provided within the temperature controller for controlling the power supply to the temperature control mechanism, so that the control unit starts and shuts off the power supply to the thermoelectric heating/cooling element only when the data is not being collected from the pyroelectric detector.

For this purpose, the power supply to the pyroelectric detector is started and shut off in synchronization with an end-of-conversion signal from an A/D converter for converting the detection signal of the pyroelectric detector into the digital signal, in synchronization with an interferential signal from a control interferometer, or in synchronization with the turn of a moving mirror after collecting a series of interferograms.

Thus, in accordance with the present invention, since the power supply to the thermoelectric heating/cooling element is started and shut off in synchronization with the end-of-conversion signal of the A/D conversion, the mixture of any possible noise into the detection signal, the possible noise being generated upon the start or the shut-off of the power supply, cannot degrade the S/N ratio of the data collected by the pyroelectric detector as long as the mixed detection signal is not collected as data.

The interferential signal of a laser interferometer as the control interferometer is used as a trigger signal for the A/D converter. Therefore, in synchronization with the interferential signal of the laser interferometer, the power supply to the thermoelectric heating/cooling element can be started and shut off while the A/D conversion is not performed. Here, it is not necessary to make the timing of starting and shutting off the power supply coincide exactly with the end of the A/D conversion, but as the timing of starting and shutting off the power supply is closer to the end of the A/D conversion, this could affect the next A/D conversion operation.

At the time when the moving mirror is turned, a series of interferograms have been already collected. Therefore, when the moving mirror is turned, no data are collected. So, at this moment, even if any possible noise is mixed into the detection signal upon the start or shut-off of the power supply to the thermoelectric heating/cooling element, the S/N ratio of the data cannot be affected.

The A/D conversion of the detection signal of the pyroelectric detector is operated at a short cycle of about $100 \sim 200\mu$ seconds while the turning cycle of the moving mirror is as long as about $0.5 \sim 2.0$ seconds. If the power supply to the thermoelectric heating/cooling element is started and shut-off in synchronization with the termination signal of the A/D conversion or the interferential signal of the laser interferometer, the start and the shut-off of the power supply can be repeated at a short cycle of about 100~200μ seconds to thereby control the temperature of the pyroelectric detector more exactly.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
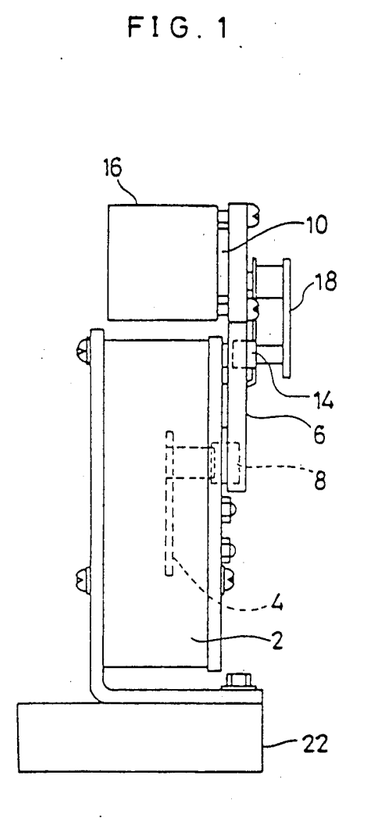
FIG. 1 is a side view of a detector comprising a pyroelectric detector and a temperature controller according to a preferred embodiment of the present invention.
Figure 2:
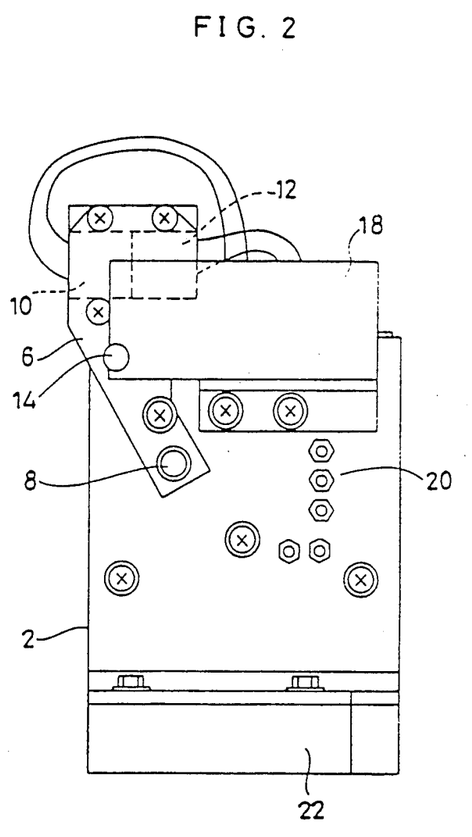
FIG. 2 is a front view of the detector of FIG. 1.

FIG. 1 is a side view of a detector according to a preferred embodiment of the present invention and FIG. 2 is a front views of the detector. A shield case 2 is assembled using several screws. A preamplifier 4 is incorporated within the shield case 2 for amplifying detection signals of a pyroelectric detector. A cooling base 6 made of copper is positioned at the front of the shield case 2. An insulating material is interposed between the shield case 2 and the cooling base 6 for thermally isolating them. A DLATGS pyroelectric detector 8 is attached to the cooling base 6 and a heating Peltier element 10 and a cooling Peltier element 12 are also attached to the cooling base 6, so that the pyroelectric detector 8 and the Peltier elements 10 and 12 are thermally coupled. To make the heat generated by the Peltier elements 10 and 12 as small as possible, the Peltier elements 10 and 12 should be adjacent to the pyroelectric detector 8. A temperature sensor 14 is attached to the cooling base 6 for detecting the temperature of the cooling base 6. A radiator 16 is close to each of the Peltier elements 10 and 12. A temperature controlling mechanism comprises the cooling base 6, the Peltier elements 10 and 12, the temperature sensor 14, and the radiators 16. A temperature control panel 18 contains a temperature controller for controlling the power supply to the Peltier elements 10 and 12. The control panel 18 is positioned close to the Peltier elements 10 and 12 and provided at the front of the shield case 2. Some connectors 20 are provided at the front of the shield case 2 for supplying the power or outputting signals. In order to electrically isolate the shield case 2 and a support for the fourier transform infrared spectrometer (FTIR), the shield case 2 is screwed to a Bakelite plate 22, so that it is secured to the support through the Bakelite plate 22.

Figure 3:
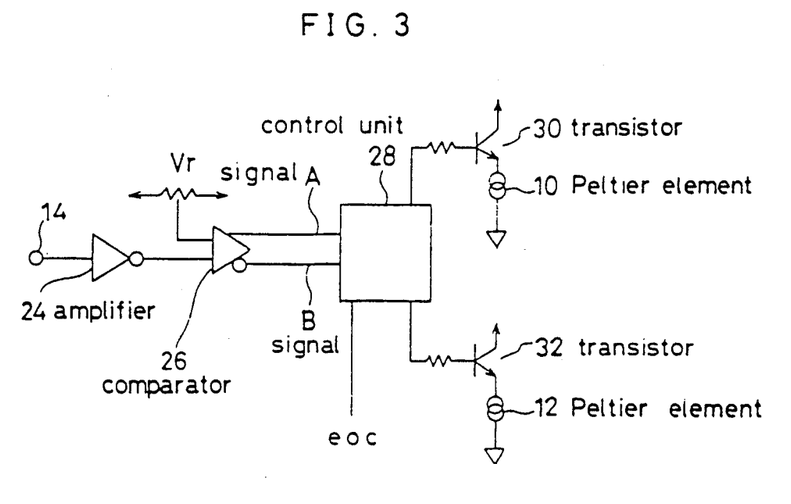
FIG. 3 is a circuit diagram of the temperature controller in the preferred embodiment.

FIG. 3 shows a part of a temperature controller mounted on the temperature control panel 18. A amplifier 24 is provided for amplifying the detection signal of the temperature sensor 14. A comparator 26 is responsive to the thus amplified detection signal to compare it with a reference voltage Vr selected according to the set temperature. Depending on the amplitude of the detection signal and the reference voltage Vr, the comparator 26 outputs a signal A for the heating Peltier element 10 and another B for the cooling Peltier element 12. When the detected temperature is lower than the set temperature, the signal A is outputted. When the detected temperature is higher than the set temperature, the signal B is outputted. A control unit 28 is responsive to the signals A and B for controlling the temperature. Further, the control unit 28 is responsive to the end-of-conversion signal (eoc) of an A/D converter converting the analog signal of the detection signal from the pyroelectric detector 8 into the digital signal for outputting a signal enabling the power supply to the Peltier elements 10 and 12 to be started or shut off in synchronization with the "eoc" signal. A driving transistor 30 is provided for driving the heating Peltier element 10. Another driving transistor 32 is provided for driving the cooling Peltier element 12. The signals for driving the Peltier elements 10 and 12, from the control unit 28, are applied to the base of each of the driving transistors 30 and 32 through a resistor.

Figure 4:
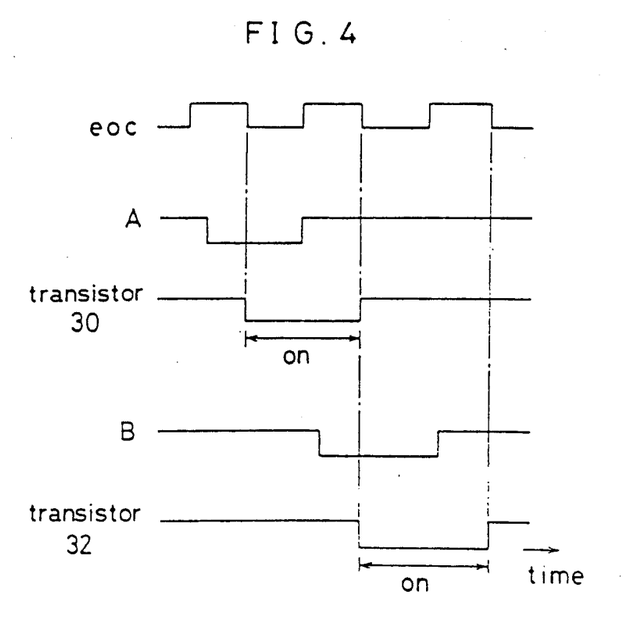
FIG. 4 is a time chart showing the operation of a temperature control unit in the preferred embodiment.

FIG. 4 shows a time chart illustrating the operation of the control unit 28 of FIG. 3. The Peltier elements 10 and 12 are controlled on/off. The detection output from the temperature sensor 14 is compared with the set voltage Vr, so that the comparator 26 outputs the signals A and B to be entered into the control unit 28. When the "eoc" signal is applied for the A/D conversion, the A/D conversion starts upon the rising of the "eoc" signal and ends at the falling of the "eoc" signal. When the A signal is in a low level at the falling of the "eoc" signal, the control unit 28 outputs a signal for turning on the driving transistor 30 driving the heating Peltier element 10. When the B signal is in a low level at the falling of the "eoc" signal, the control unit 28 outputs another signal for turning on the driving transistor 32 driving the cooling Peltier element 12.

In a case where the DLATGS pyroelectric detector is used as the pyroelectric detector 8 and it is set at 60° C. to provide a high S/N ratio, the temperature must be precisely controlled. P1D control is suitable for this purpose. Since the temperature must be precisely controlled, it is preferable that a time from the start of the power supply to the Peltier elements 10 and 12 to the shut-off of the power supply is minimized. In such a case, the "eoc" signal of the A/D conversion is preferably used as in the preferred example. The interferential signal of a laser interferometer, or the turn of a moving mirror, after collecting a series of interferograms, could also be used. The Peltier element provides a different direction of moving heat, dependent on the polarization of an applied voltage. Therefore, a single Peltier element can control a constant temperature close to room temperature.

Figure 5:
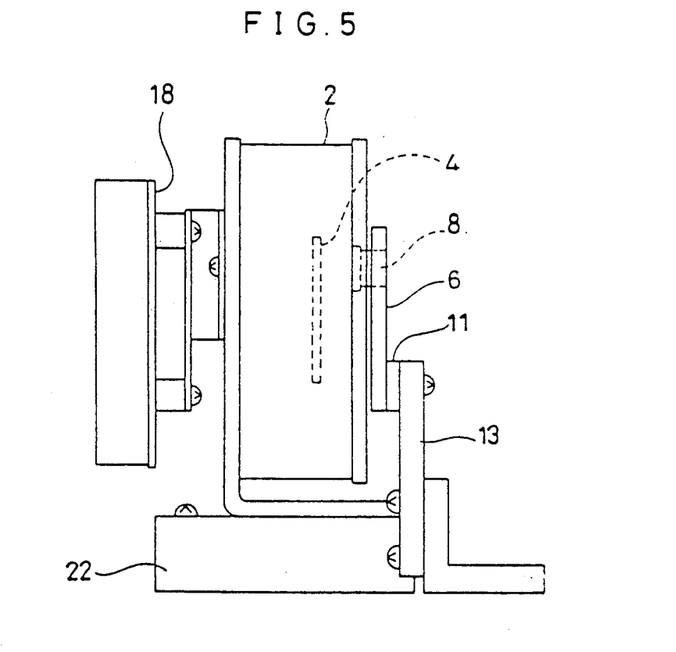
FIG. 5 is a side view of another detector comprising another pyroelectric detector and another temperature controller according to another preferred embodiment of the present invention.
Figure 6:
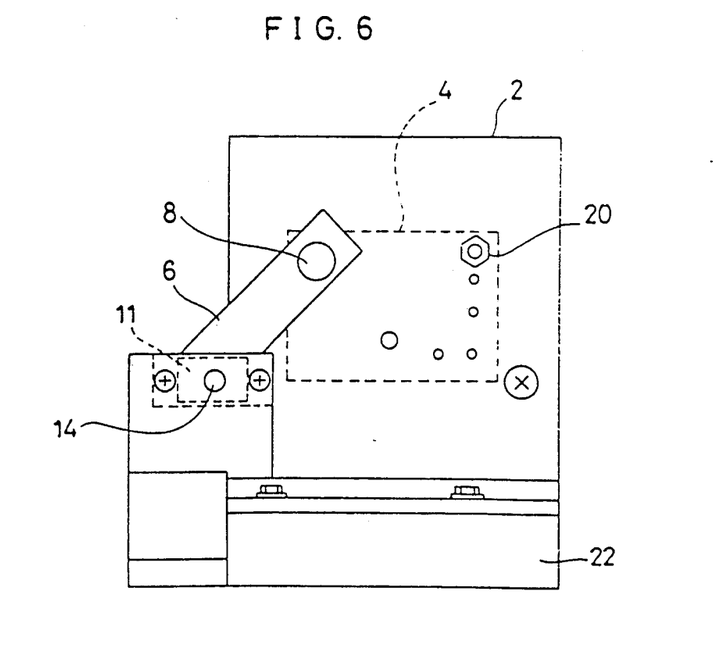
FIG. 6 is a front view of another detector of detector of FIG. 5.

FIGS. 5 and 6 show another preferred embodiment in which a single Peltier element is used for heating and cooling the detector. The preamplifier 4 is provided in the shield case 2 for amplifying the detection signal of the pyroelectric detector. At the front side of the shield case 2, the pyroelectric detector 8 such as the DLATGS system is provided and is thermally connected to a single Peltier element 11 via the cooling base 6. The temperature sensor 14 is attached adjacent to the Peltier element 11 for detecting the temperature of the cooling base 6. A metal 13 is provided for serving to radiate the heat of the Peltier element 11. The temperature control panel 18 contains the temperature controller for controlling the power control to the Peltier element 11. The Bakelite plate 22 and the connector 20 are provided.

Figure 7:
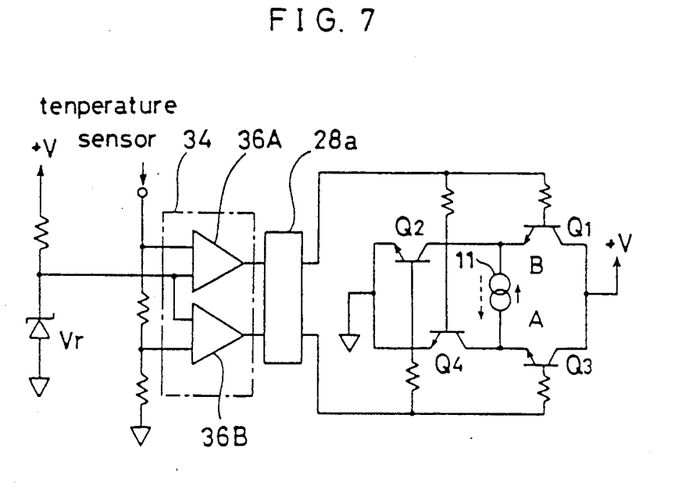
FIG. 7 is a circuit diagram of another temperature controller in another preferred embodiment.

In said another preferred embodiment, the single Peltier element 11 serves to heat and cool the detector in conjunction with the temperature controller having a circuit shown in FIG. 7, the temperature controller being mounted on the temperature control panel 18.

Referring to FIG. 7, a comparator 36A is provided for forcing the Peltier element to heat the detector while another comparator 36B is provided for forcing the Peltier element to cool the detector. The signal from the temperature sensor 14 is entered into the comparator 36A, and also inputted into the comparator 36B after being reduced by a certain voltage. A reference voltage Vr is applied to the comparators 36A and 36B by a Zener diode to constitute a window comparator 34. The signal from the temperature sensor 14 provides a voltage as a function of environment temperature.

The outputs from the two comparators 36A and 36B in the window comparator are input to a control unit 28a, so that the power supply to the Peltier element 11 is started and shut-off in synchronization with the end-of-conversion "eoc" signal of the A/D conversion as explained with reference to FIG. 4. In order to apply the power to the Peltier element 11, two-series single ended Push Pull Amplification circuits including transistors Q1 through Q4 are used.

Figure 8:
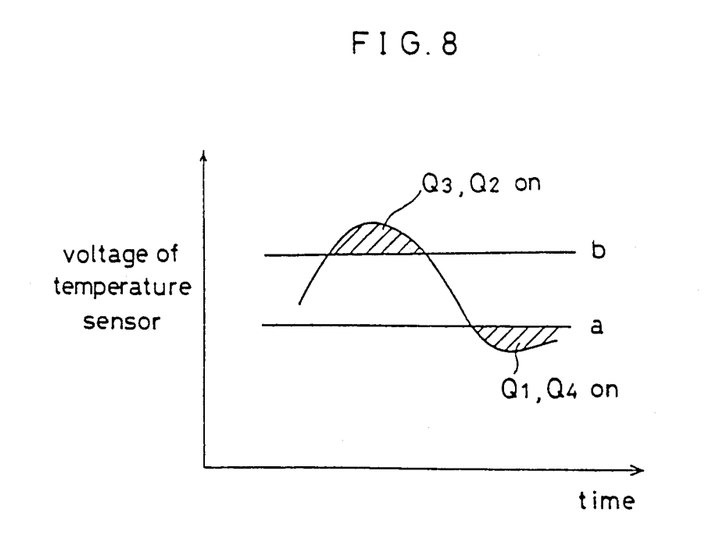
FIG. 8 is a diagram showing the operation of a window comparator in the circuit diagram of FIG. 7.

The temperature control operation of the circuit of FIG. 7 is as follows. As shown in FIG. 8, the window comparator 34 has a high-voltage threshold b and a low-voltage threshold a. When the detection voltage of the temperature sensor 14 is between the two thresholds a and b, the outputs of the two comparators 36A and 36B are both in a low level, so that none of the transistors Q1 through Q4 are turned on and no current flows to the Peltier element 11. When the detection voltage of the temperature sensor 14 exceeds the threshold b, the transistors Q3 and Q2 are turned on at the timing when the "eoc" signal of the A/D converter falls, so that a current flows across the Peltier element 11 from a point A to another point B. Then, the Peltier element 11 cools the pyroelectric detector.

When the detection voltage of the temperature sensor 14 becomes lower than the threshold a, the transistors Q1 and Q4 are turned on at the timing when the "eoc" signal of the A/D converter falls, so that a current flows across the Peltier element 11 from the point B to the point A. Then, the Peltier element heats the pyroelectric detector.

Figure 9:
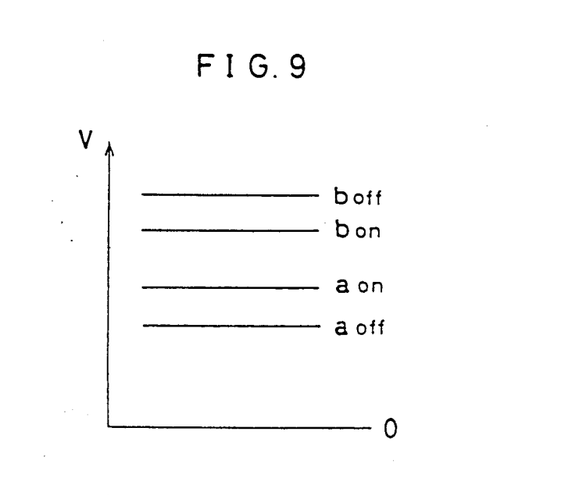
FIG. 9 is a graph showing hysteresis of the window comparator.

Normally, the window comparator 34 has hysteresis as shown in FIG. 9. Depending upon the off-set of the comparators 36A and 36B, the outputs of the two comparators 36A and 36B may be both in a high level, although it is rare. In such a case all of the transistors Q1 through Q4 in the circuit of FIG. 7 are turned on, so that a shortcircuiting current flows from the transistor Q1 to Q2 or from the transistor Q3 to Q4 without flowing across the Peltier element 11.

Figure 10:
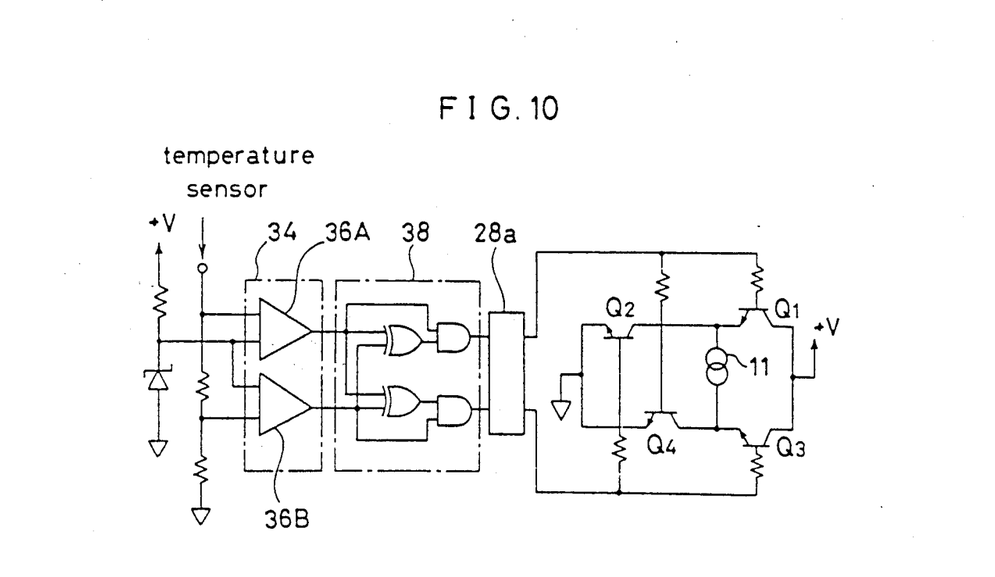
FIG. 10 is a circuit diagram of a temperature controller having a protection circuit.

FIG. 10 shows a circuit comprising a protective circuit 38 for preventing the above-described shortcircuit. In the circuit of FIG. 10, the protective circuit 38 comprising an exclusive-OR gate circuit and an AND gate circuit is interposed between the window comparator 38 and the control unit 28a. When the outputs of the two comparators 36A and 36B are both in a high level, the output of the exclusive-OR gate circuit is in a low level, so that the AND gate circuit prevents all of the transistors Q1 through Q4 from being turned on. Thus, the transistors Q1 through Q4 are protected from being damaged.

While FIG. 7 shows a case of simple comparative control, more suitable control is possible using the temperature information from the temperature sensor 14.

As described above, in accordance with the present invention, in the temperature control mechanism for keeping the temperature of the pyroelectric detector constant, the power supply to the thermoelectric cooling element is started and shut-off only while no date collection of the detection signal from the pyroelectric detector is done, so that the S/N ratio of the data from the pyroelectric detector is increased.

While only certain embodiments of the present invention have been described, it will be apparent to those skilled in the art that various changes and modifications may be made therein without departing from the spirit and scope of the present invention as claimed.

What is claimed is:

1. A detector comprising:
   pyroelectric detector means for detecting pyroelectricity;
   thermoelectric heating/cooling means for keeping the temperature of said pyroelectric detector means constant;
   temperature sensor means for sensing the temperature of said pyroelectric detector means;
   temperature controller means responsive to a detection signal from said temperature sensor means for controlling a power supply to said thermoelectric heating/cooling means; and
   control unit means provided within said temperature controller means for synchronizing the operation of said pyroelectric detector means and said thermoelectric heating/cooling means such that the power supply of said thermoelectric heating/cooling means is turned on and off only when data is not being collected by said pyroelectric detector means.

2. The detector of claim 1, wherein said control unit means starts and shuts off the power supply to said thermoelectric heating/cooling means in synchronization with an end-of-conversion signal from an A/D converter for converting said detection signal of said pyroelectric detector means into a digital signal, in synchronization with an inferential signal from a control interferometer, or in synchronization with a turn of a moving mirror after collecting a series of interferograms.

3. The detector of claim 1, wherein said thermoelectric heating/cooling means comprises a thermoelectric heating element and a thermoelectric cooling element.

4. The detector of claim 1, wherein said thermoelectric heating/cooling means comprises a single thermoelectric element.

5. The detector of claim 4, wherein said temperature controller means comprises two comparators, and two single-ended push pull amplification circuits.

6. The detector of claim 5, wherein said temperature controller means further comprises a protective circuit interposed between said two comparators and said two single-ended push pull amplification circuits for protecting transistor means in said single-ended push pull amplification circuits.

* * * * *